United States Patent

Azuma

(10) Patent No.: US 9,301,138 B2
(45) Date of Patent: Mar. 29, 2016

(54) WIRELESS COMMUNICATION APPARATUS, RECORDING MEDIUM, AND METHOD

(71) Applicant: Yoshikazu Azuma, Tokyo (JP)

(72) Inventor: Yoshikazu Azuma, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 70 days.

(21) Appl. No.: 13/971,352

(22) Filed: Aug. 20, 2013

(65) Prior Publication Data

US 2014/0059643 A1 Feb. 27, 2014

(30) Foreign Application Priority Data

Aug. 21, 2012 (JP) .................. 2012-182026

(51) Int. Cl.
*H04L 9/08* (2006.01)
*H04W 12/06* (2009.01)

(52) U.S. Cl.
CPC ..................... *H04W 12/06* (2013.01)

(58) Field of Classification Search
CPC ....... H04W 12/06; H04W 12/04; G06F 15/16
See application file for complete search history.

(56) References Cited

U.S. PATENT DOCUMENTS

| | | | |
|---|---|---|---|
| 7,231,521 B2 * | 6/2007 | Buddhikot et al. | 713/171 |
| 7,721,325 B2 * | 5/2010 | Lee et al. | 726/4 |
| 7,739,513 B2 * | 6/2010 | Iwamura | H04L 9/0838 713/183 |
| 7,912,222 B2 | 3/2011 | Hagiwara | |
| 7,912,224 B2 * | 3/2011 | Lee et al. | 380/278 |
| 8,127,340 B2 | 2/2012 | Azuma | |
| 8,145,194 B2 * | 3/2012 | Yoshikawa et al. | 455/411 |
| 8,649,275 B2 * | 2/2014 | Pyatkovskiy et al. | 370/250 |
| 2001/0033221 A1 * | 10/2001 | Thomas et al. | 340/5.61 |
| 2003/0120925 A1 * | 6/2003 | Rose | G06Q 20/341 713/176 |
| 2004/0073795 A1 * | 4/2004 | Jablon | 713/171 |
| 2004/0131185 A1 * | 7/2004 | Kakumer | 380/247 |
| 2005/0201557 A1 * | 9/2005 | Ishidoshiro | 380/44 |
| 2005/0276418 A1 * | 12/2005 | Hagiwara | 380/270 |
| 2009/0222659 A1 * | 9/2009 | Miyabayashi et al. | 713/156 |
| 2010/0002884 A1 * | 1/2010 | Sherman | 380/278 |
| 2010/0146129 A1 | 6/2010 | Nakahara | |

(Continued)

FOREIGN PATENT DOCUMENTS

| | | |
|---|---|---|
| JP | 2004-118488 | 4/2004 |
| JP | 2005-333606 | 12/2005 |

(Continued)

OTHER PUBLICATIONS

Wi-Fi Protected Setup Specification Version 1.0h (Dec. 2006) . . . .*

*Primary Examiner* — Taghi Arani
*Assistant Examiner* — Sharon Lynch
(74) *Attorney, Agent, or Firm* — Oblon, McClelland, Maier & Neustadt, L.L.P.

(57) ABSTRACT

A wireless communication apparatus includes an optical wireless receiving unit receiving a pseudo random number; an authentication code generator generating an authentication code based on the pseudo random number received by the optical wireless receiving unit; and a wireless communication unit determining whether authentication using the authentication code with a given wireless communication apparatus is successful, and performing wireless communications with the given wireless communication apparatus when determining that the authentication using the authentication code with a given wireless communication apparatus is successful.

10 Claims, 6 Drawing Sheets

(56) References Cited

U.S. PATENT DOCUMENTS

| | | | |
|---|---|---|---|
| 2010/0169646 A1* | 7/2010 | Zhang et al. | 713/171 |
| 2010/0251345 A1* | 9/2010 | James et al. | 726/5 |
| 2010/0254314 A1* | 10/2010 | Tsuchiya | 370/328 |
| 2010/0313241 A1* | 12/2010 | Lee et al. | 726/3 |
| 2011/0142021 A1* | 6/2011 | Kito | 370/338 |
| 2011/0176457 A1* | 7/2011 | Yee | 370/254 |
| 2011/0275316 A1* | 11/2011 | Suumaki et al. | 455/41.1 |
| 2012/0030466 A1* | 2/2012 | Yamaguchi | 713/168 |
| 2012/0182884 A1* | 7/2012 | Pyatkovskiy et al. | 370/250 |
| 2012/0250863 A1* | 10/2012 | Bukshpun et al. | 380/278 |
| 2012/0265913 A1* | 10/2012 | Suumaki et al. | 710/303 |
| 2013/0036231 A1* | 2/2013 | Suumaki | 709/228 |
| 2013/0057913 A1* | 3/2013 | Park | 358/1.15 |
| 2013/0103807 A1* | 4/2013 | Couto et al. | 709/220 |
| 2013/0195271 A1* | 8/2013 | Miyabayashi et al. | 380/255 |
| 2013/0309971 A1* | 11/2013 | Kiukkonen et al. | 455/41.2 |
| 2013/0332739 A1* | 12/2013 | Yi et al. | 713/171 |
| 2014/0068267 A1* | 3/2014 | Le Saint et al. | 713/171 |
| 2014/0072119 A1* | 3/2014 | Hranilovic et al. | 380/270 |
| 2014/0123213 A1* | 5/2014 | Vank et al. | 726/1 |

FOREIGN PATENT DOCUMENTS

| | | | | |
|---|---|---|---|---|
| JP | 2006-123183 | | 5/2006 | |
| JP | 2006-254077 | | 9/2006 | |
| JP | 2008-283422 | | 11/2008 | |
| JP | 2013-21499 | | 1/2013 | |
| WO | WO 2013/008939 A1 | | 1/2013 | |
| WO | WO 2013/149459 | * | 10/2013 | H04M 1/00 |
| WO | WO 2013/153171 | * | 10/2013 | H04W 12/06 |

* cited by examiner

WIRELESS COMMUNICATION APPARATUS, RECORDING MEDIUM, AND METHOD

CROSS-REFERENCE TO RELATED APPLICATIONS

The present application is based on claims the benefit of priority under 35 U.S.C §119 of Japanese Patent Application No. 2012-182026 filed Aug. 21, 2012, the entire contents of which are hereby incorporated herein by reference.

BACKGROUND OF THE INVENTION

1. Field of the Invention

The present invention relates to a wireless communication apparatus, a recording medium, and a method.

2. Description of the Related Art

Recently, more and more protocols have been proposed for a simple setup of wireless LAN connection to reduce its troublesome installation step. Currently, as such simple setup protocols, two methods have become popular: one is a PIN method in which a PIN code, which is known only to (accessible only by) a user having valid authority, is used for authentication between apparatuses; and the other is a push-button method.

Especially, in the push-button method, it is possible to eliminate troublesome data input, and it is further possible to easily apply to an electronic device such as a home electrical appliance having no user interface for data input. Due to these features, the push-button method if expected to be used in various applications.

In this regard, Japanese Laid-open Patent Publication No. 2008-283422 (Patent Document 1) discloses a method in which a secure connection is established between a printer and a camera based on a Push Button Configuration protocol of a Wi-Fi Protected Setup (WPS), the protocol having been standardized by IEEE 802.11.

In the following, the WPS push button method is briefly described with reference to FIG. 1. In WPS, a function to provide configuration data (setting data) necessary for the secure connection is called a "registrar". Meanwhile, a function to set communication parameters which are provided from the "registrar" is called an "enrollee".

The WPS protocol sequence is divided into three main phases. In the first phase, a temporary connection (for plain text) is established between first and second apparatuses, via a probe request and open authentication, when, after a predetermined time period (e.g., from several tens of seconds to several minutes) has passed since a push button of the first apparatus is pressed, a push button of the second apparatus is pressed.

Next, in the second phase, the configuration data are shared which is necessary for the authentication and secure connection based on an EAP-WSC protocol. In the EAP-WSC protocol, to make it possible to share an encryption key by using a communication line on which no security is ensured, a Diffie-Hellman key exchange (hereinafter simplified as "DH") algorithm is employed.

After the enrollee and registrar mutually transmit respective public keys to each other, the enrollee and registrar generate a passphrase (secret key), which is to be commonly used between the enrollee and registrar, based on the confidential information of the enrollee and registrar and the public key received from the registrar and enrollee, respectively.

Finally, in the third phase, based on the WPA protocol, after an encryption key is generated and shared using a predetermined algorithm based on the passphrase generated in the second phase, both the enrollee and registrar encrypt respective communication data using the encryption key (secret key) which is common between the enrollee and registrar. By doing this, a secure connection is established.

However, it is known that "DH", which is used in the second phase, is vulnerable to a man-in-the-middle attack. To eliminate this vulnerability, it is necessary to carry out some kind of mutual authentication between the enrollee and registrar. In this regard, in the WPS push button method, the authentication indicating that the other part is valid (correct) is achieved based on a fact that the push buttons (of the enrollee and registrar) are pressed within the same time period (i.e., a fact that one party knows when the other party pushes the button).

Specifically, in response to the press down of the push button of the enrollee, the enrollee apparatus transmits a predetermined authentication code to the other party, and the registrar apparatus, where the push button of the registrar apparatus is pressed in the same time period when the push button of the enrollee apparatus is pressed, compares the authentication code received from the enrollee apparatus and the authentication code of the registrar apparatus.

However, the authentication code used in the push button method is typically a fixed value. Furthermore, in many cases, the authentication code is made public (disclosed) in the specification manual or the like. Therefore, it is not possible to completely eliminate the risk of a man-in-the-middle attack by a malicious third party.

The present invention is made in light of the above problem, and may provide a wireless communication apparatus, a recording medium, and a method capable of appropriately reducing a security risk in a wireless LAN connection setting.

SUMMARY OF THE INVENTION

According to an aspect of the present invention, a wireless communication apparatus includes an optical wireless receiving unit receiving a pseudo random number; an authentication code generator generating an authentication code based on the pseudo random number received by the optical wireless receiving unit; and a wireless communication unit determining whether authentication using the authentication code with a given wireless communication apparatus is successful, and performing wireless communications with the given wireless communication apparatus when determining that the authentication using the authentication code with a given wireless communication apparatus is successful.

BRIEF DESCRIPTION OF THE DRAWINGS

Other objects, features, and advantages of the present invention will become more apparent from the following description when read in conjunction with the accompanying drawings, in which.

DETAILED DESCRIPTION OF THE PREFERRED EMBODIMENTS

Figure 1:
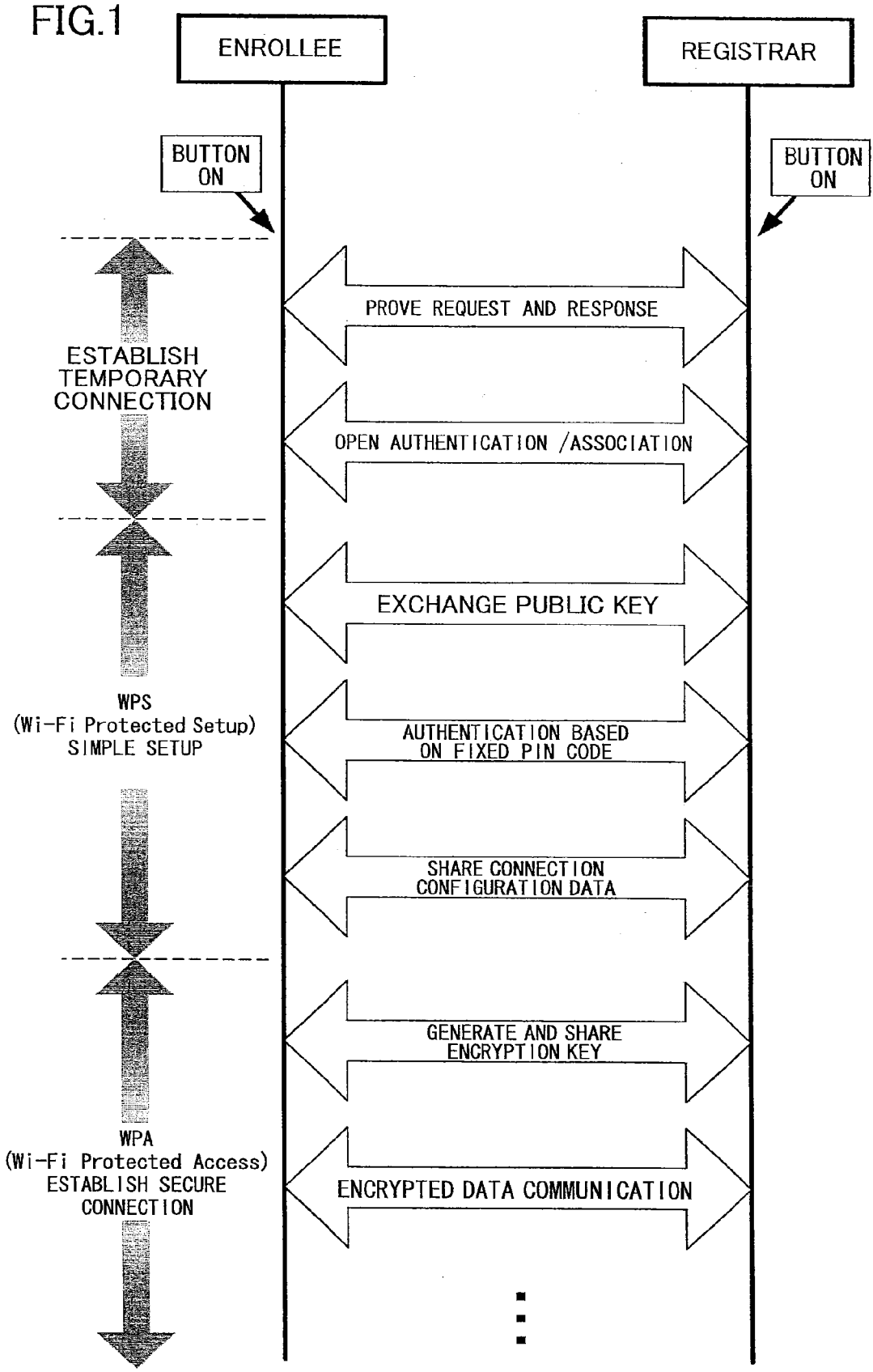
FIG. 1 is a drawing schematically showing a WPS simple setup sequence.

In the following, embodiments of the present invention are described with the accompanying drawings. However, it should be noted that the present invention is not limited to those embodiments described below. Throughout the figures, the same reference numerals are used to describe the same elements, and the descriptions thereof may be omitted.

A wireless communication apparatus 100 according to an embodiment may be referred to as a wireless communication apparatus which is compliant with a push-button-type simple configuration protocol. As an example of the push-button-type simple configuration protocol, there is a "Push Button Configuration Method" of the Wi-Fi Protected Setup (WPS) which is standardized by IEEE 802.11.

In the following descriptions, an example is described where the wireless communication apparatus 100 employs the "Push Button Configuration method" (herein after simplified as "PB method") for WPS simple configuration setup.

In WPS, in a simple configuration setup, the function to provide "Configuration Data" which are necessary for a secure connection is called the "Registrar" and the function to set the provided "Configuration Data" is called the "Enrollee". Therefore, the wireless communication apparatus 100 according to an embodiment may include any one of the Registrar and Enrollee or both the Registrar and Enrollee depending on the application.

Namely, the wireless communication apparatus 100 according to the embodiment may be used (provided) as a wireless LAN base station (access point). In this case, the wireless communication apparatus 100 serves as the Registrar (i.e., includes (provides) the function of the Registrar). Further, the wireless communication apparatus 100 according to the embodiment may be used (provided) as a wireless terminal (wireless station). In this case, the wireless communication apparatus 100 serves as the Enrollee (i.e., includes (provides) the function of the Enrollee).

Further, the wireless communication apparatus 100 according to the embodiment may be used (provided) as any electronic device, (e.g., Multi Function Peripheral (MFP), cellular phone, tablet terminal and the like), which is compliant with the "Wi-Fi Direct" formulated by the Wi-Fi Alliance. In this case, the wireless communication apparatus 100 serves as both the Registrar and Enrollee (i.e., includes (provides) the functions of the Registrar and Enrollee), and selectively activates the functions.

Figure 2:
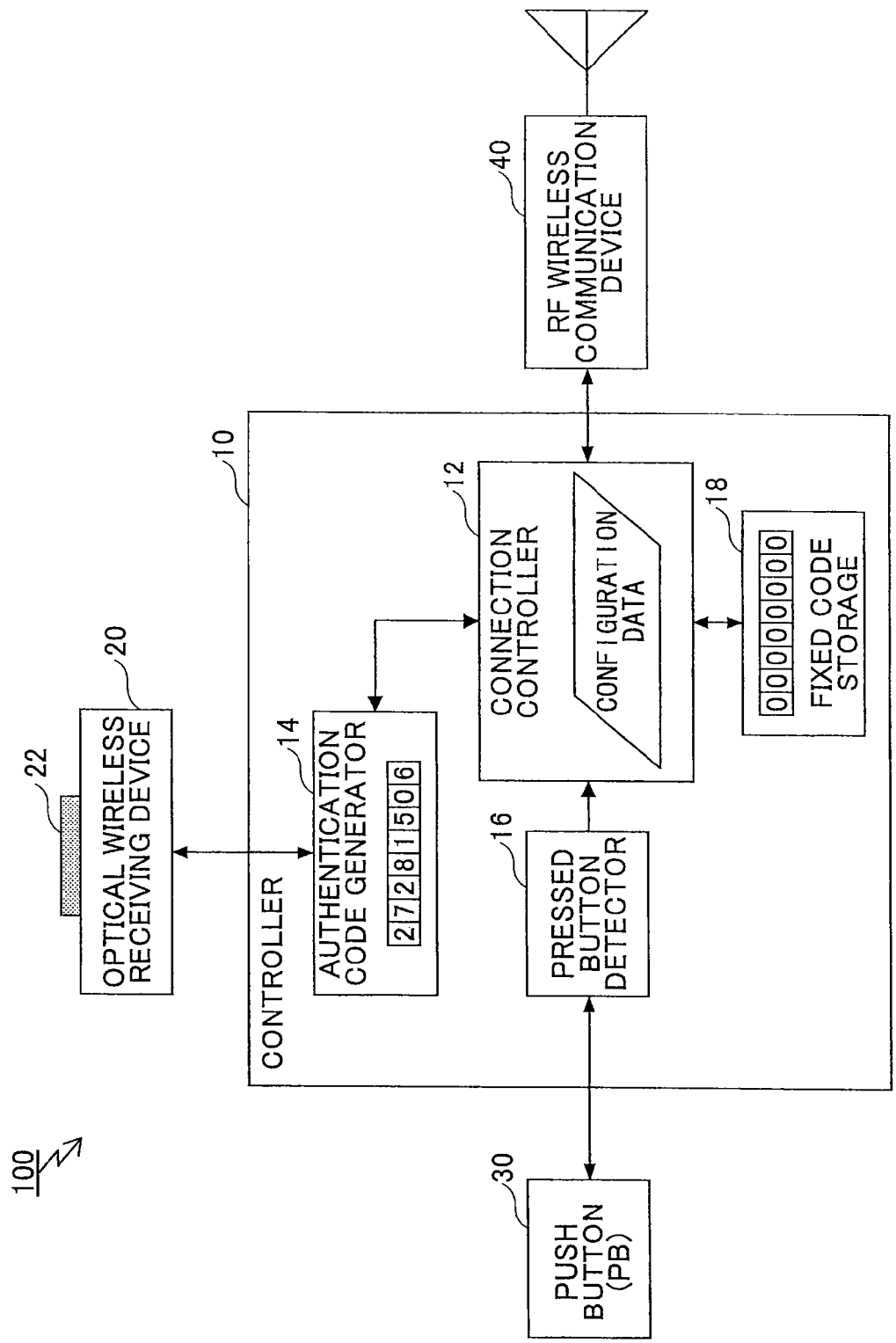
FIG. 2 is a functional block diagram of a wireless communication apparatus according to an embodiment.

FIG. 2 is a functional block diagram of the wireless communication apparatus 100 according to an embodiment of the present invention. As shown in FIG. 2, the wireless communication apparatus 100 includes an optical wireless receiving device 20, a push button 30, an RF wireless communication device 40, and a controller 10.

The optical wireless receiving device 20 includes a light receiving section 22 having an appropriate light receiving device(s) such as diode(s), so as to achieve (provide) optical wireless communications using light having a wavelength of visible to infrared light. For example, the optical wireless receiving device 20 may be referred to as a "data receiving device" in the illumination light communication using an LED light.

The push button 30 herein referred to as a "push button" used in the WPS PB method, and may be either a mechanical button switch or a software button (in GUI).

The controller 10 includes a connection controller (connection setting section) 12, an authentication code generator 14, a pressed button detector 16, and a fixed code storage 18.

The pressed button detector 16 detects a fact that the push button 30 is pressed (down), and reports the detected fact to the controller 12. In response to the report, the controller 12 controls the RF wireless communication device 40 so as to perform data communications to share the configuration data which are necessary for the secure connection to be established between the wireless communication apparatus 100 and the other wireless communication apparatus whose push button is pressed within a predetermined time period (e.g., tens of seconds to several minutes) which is started since the push button 30 is pressed (hereinafter simplified as "configuration data").

When the wireless communication apparatus 100 serves (is functioned) as the wireless LAN base station (access point), the controller 12 serves as the Registrar, so as to provide the configuration data to the Enrollee of the other wireless communication apparatus via the RF wireless communication device 40.

Meanwhile, when the wireless communication apparatus 100 serves (is functioned) as the wireless terminal (wireless station), the controller 12 serves as the Enrollee, so as to receive the configuration data from the Registrar of the other wireless communication apparatus via the RF wireless communication device 40 and set various communication parameters.

As described above, an example configuration of the wireless communication apparatus 100 is described. Next, in a case of FIG. 3, a process performed by the wireless communication apparatus 100 is described with reference to a flowchart of FIG. 4. In the following description, the functional block diagram of FIG. 2 may be referred to when necessary.

Here, a case is described where the wireless LAN simple setup ("PB method") is performed between the wireless communication apparatus 100 having the Registrar function (hereinafter may be referred to as a "Registrar 100A") and the wireless communication apparatus 100 having the Enrollee function (hereinafter may be referred to as an "Enrollee 100B") under an LED lighting device 200 as shown in the wireless LAN system of FIG. 3.

Figure 3:
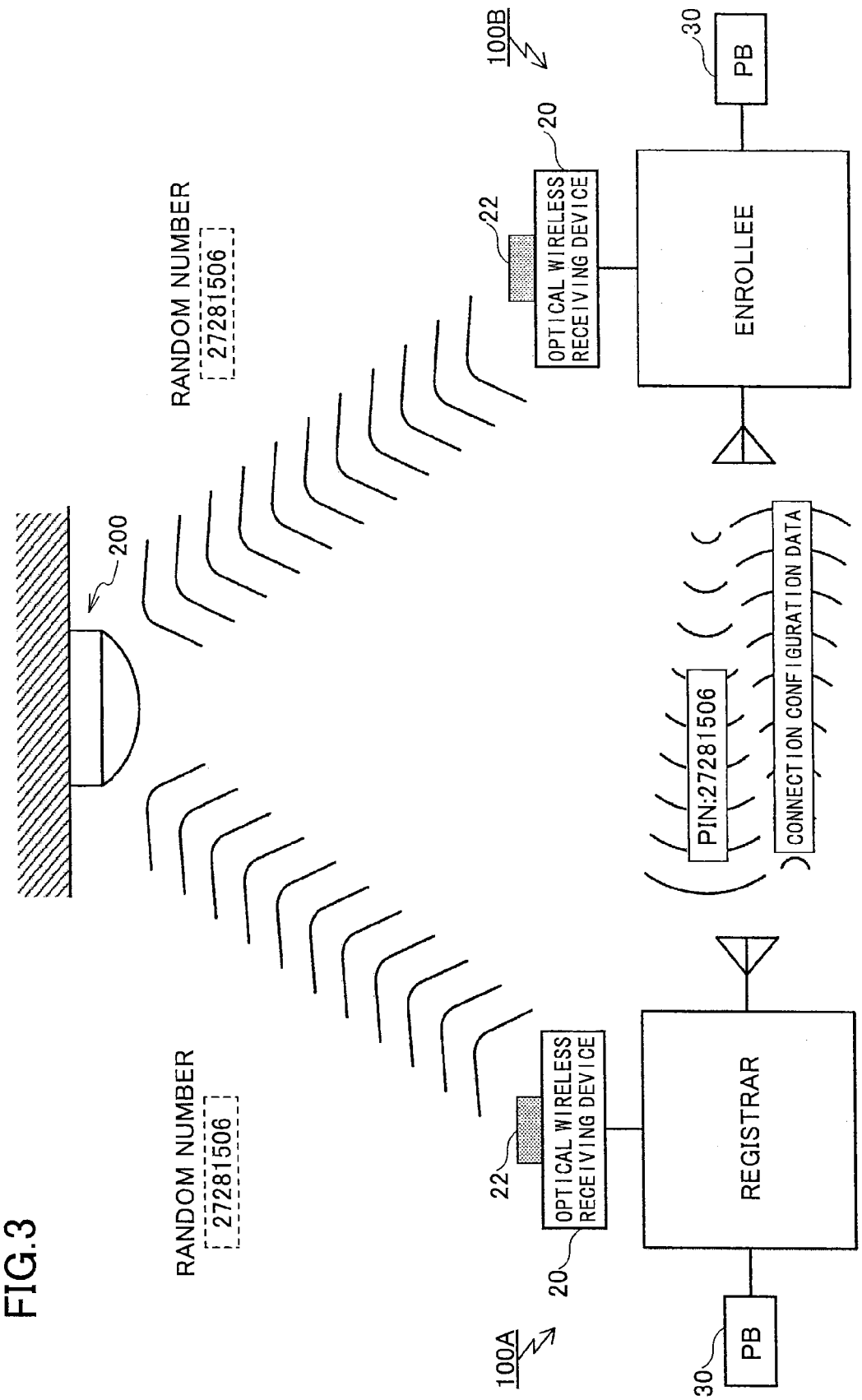
FIG. 3 is a drawing showing a wireless LAN system according to the embodiment.

In the case of FIG. 3, the LED lighting device 200 serves (is provided) as a data distribution device used in the illumination light communication (i.e., "optical wireless transmission unit").

To that end, the LED lighting device 200 converts a pseudo random number (i.e., digital data), which is internally or externally generated, into a flashing (blinking) signal having a frequency in a range from several kHz to several hundred kHz, and blinks on and off the LED in high speed in synchronization with the converted flashing signal (optical wireless signal) to distribute the pseudo random number in the room of the LED lighting device 200.

In this case, it is preferable that the distributed pseudo random number may be updated every predetermined time interval to reinforce the security.

The optical wireless receiving device 20 starts its receiving operation either at the same time when the wireless communication apparatus 100 is started or in response to the detection that the push button 30, which is described below, is pressed. Then, the optical wireless receiving device 20 performs WE conversion from the flashing signal (illumination light) blinking on and off in high speed from the LED lighting device 200 into an electronic signal and demodulates the electronic signal to acquire the pseudo random number (digital data).

The optical wireless receiving device 20 transmits the acquired pseudo random number (digital data) to the authentication code generator 14.

The authentication code generator 14 generates an authentication code, based on the pseudo random number received from the optical wireless receiving device 20, in accordance with a predetermined algorithm, and stores the generated authentication code into a temporary memory (buffer) (of the authentication code generator 14).

Here, it should be noted that the algorithm to generate the authentication code is not limited. Namely, for example, an algorithm may be used in which the received pseudo random number is directly used as the authentication code. Further, when the pseudo random number distributed from the LED lighting device 200 is periodically updated, the authentication code generator 14 generates (updates) new authentication code based on the updated pseudo random number, and replaces the authentication code currently stored in the temporary memory (buffer) by the updated authentication code.

In the following, the authentication code stored in the temporary memory (buffer) may be referred to as an "optical wireless PIN code".

Figure 4:
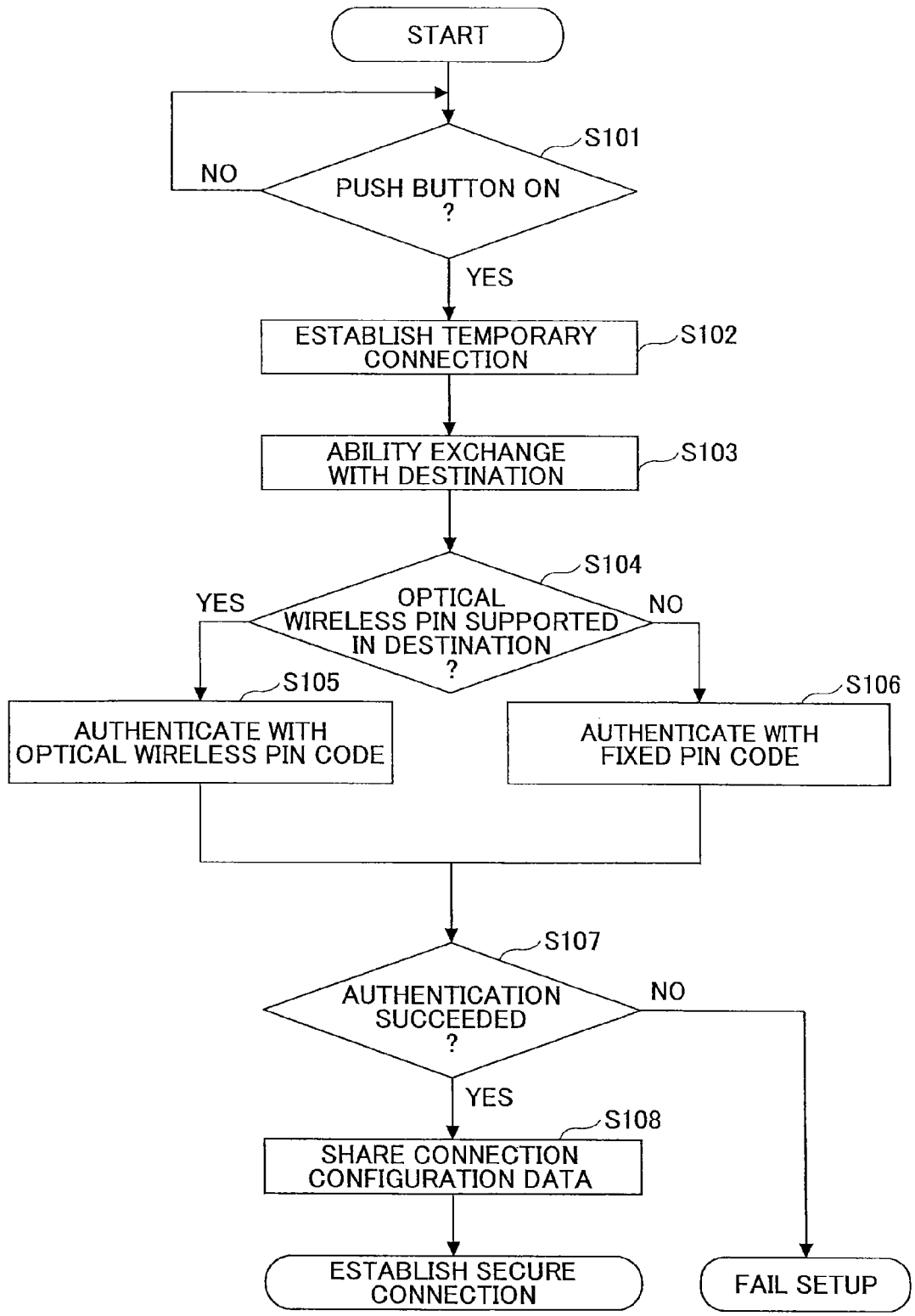
FIG. 4 is a flowchart of a process performed by the wireless communication apparatus according to the embodiment.

FIG. 4 is a flowchart of a process performed by the controller 12 of the wireless communication apparatus 100 according to the embodiment. At the same time when wireless communication apparatus 100 is started up, the controller 12 also starts waiting for detecting the fact that the push button 30 is pressed (No in step S101).

When the fact that the push button 30 is pressed is detected (Yes in step S101), the controller 12 establishes a temporary connection between the wireless communication apparatus 100 and the other wireless communication apparatus whose push button is pressed within a predetermined time period (e.g., tens of seconds to several minutes) which is started since the push button 30 is pressed (step S102).

Next, in step S103, the controller 12 exchanges data indicating which functions are supported (hereinafter may be referred to as an "ability exchange") with the other wireless communication apparatus which is connected from the wireless communication apparatus 100.

Specifically, the controller 12 exchanges (receives) the data indicating whether the other wireless communication apparatus connected from the wireless communication apparatus 100 has a function to generates the optical wireless PIN code.

As a result, when it is determined that the other wireless communication apparatus connected from the wireless communication apparatus 100 has the function to generate the optical wireless PIN code (i.e., supports to handle the optical wireless PIN code) (Yes in step 104), the controller 12 performs an authentication process based on the latest optical wireless PIN code stored in the temporary memory of the authentication code generator 14 (step S105).

Specifically, the Enrollee 100B reads the latest optical wireless PIN code stored in the temporary memory of the authentication code generator 14, and transmits the latest optical wireless PIN code to the Registrar 100A. Then, the Registrar 100A compares the latest optical wireless PIN code received from the Enrollee 100B with the latest optical wireless PIN code stored in the temporary memory of the authentication code generator 14 of the Registrar 100A, and performs authentication.

On the other hand, when it is determined that the other wireless communication apparatus connected from the wireless communication apparatus 100 has no function to generates the optical wireless PIN code (i.e., the other wireless communication apparatus does not support the handling of the optical wireless PIN code) (No in step 104), the controller 12 performs the authentication process based on a fixed code stored in the fixed code storage 18 (hereinafter referred to as a "fixed PIN code") (step S106).

Specifically, the Enrollee 100B reads the fixed PIN code stored in the fixed code storage 18, and transmits the fixed PIN code to the Registrar 100A. Then, the Registrar 100A compares the fixed PIN code received from the Enrollee 100B with the fixed PIN code stored in the fixed code storage 18 of the Registrar 100A, and performs authentication.

As a result, when the authentication fails (NO in step S107), the setup fails.

On the other hand, when the authentication succeeds (YES in step S107), the process goes to step S108, a predetermined data communication is performed to share the configuration data.

Specifically, the Registrar 100A provides (transmits) the configuration data possessed by the Registrar 100A to the Enrollee 100B, and the Enrollee 100B sets necessary communication parameters based on the configuration data received from the Registrar 100A. After that, the encryption key is generated and shared, so as to establish the secure connection.

Figure 5:
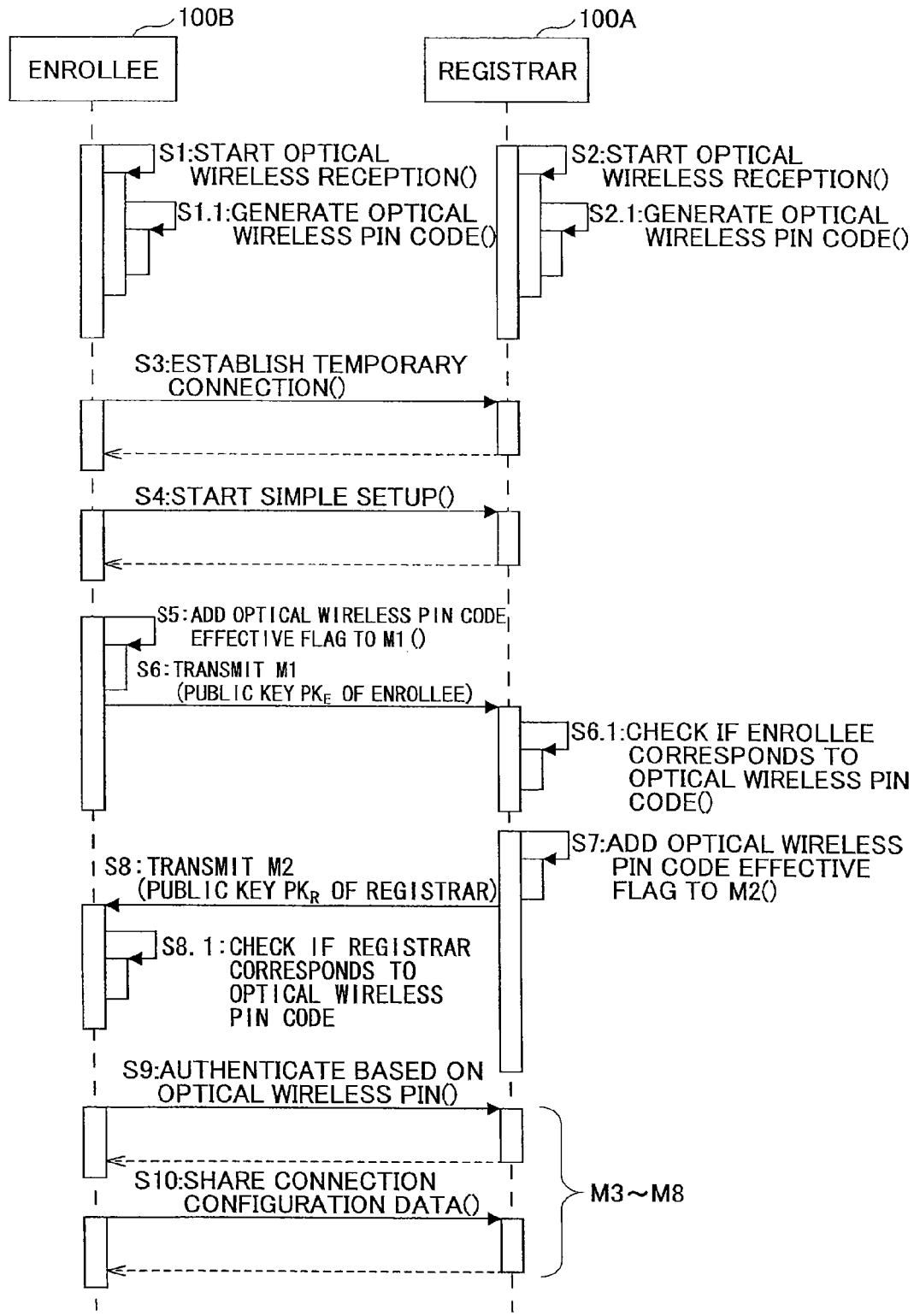
FIG. 5 is a drawing schematically showing a simple setup sequence according to the embodiment.

Next, an example sequence of the simple setup performed between the Registrar 100A and the Enrollee 100B is described with reference to FIG. 5.

A WPS protocol sequence is divided into three main phases. In the first phase, a temporary connection (in plain text) is established between wireless communication apparatuses in which a simple setup is to be performed.

In the second phase, the authentication based on the EAP-WSC protocol and the sharing of the configuration data are performed. In the third phase, a secured connection is established after the encryption key is generated and shared based on the WPA protocol.

The above second phase generally includes eight messages (M1 through M8). The messages M1 and M2 correspond to the communications exchange to share the Diffie-Hellman key. In the sequence of FIG. 4, the "ability exchange" is performed using the messages N1 and M2.

In the following, the simple setup sequence performed by the Registrar 100A and the Enrollee 100B is Described step by step.

First, the Registrar 100A and the Enrollee 100B start receiving the optical wireless signal at the same time when the Registrar 100A and the Enrollee 100B, respectively, are started up or when the fact that the respective push button 30 are pressed (S1/S2). Then the Registrar 100A and the Enrollee 100B generate respective optical wireless PIN codes based on the received pseudo random number (S1.1/S2.1).

Next, the Enrollee 100B issues a probe request across a predetermined time period after the push button 30 of the Enrollee 100B is pressed. During the predetermined time period, when the push button 30 of the Registrar 100A is pressed and the Registrar 100A responds to the probe request, a temporary connection in plain text is established between the Enrollee 100B which has issued the probe request and the Registrar 100A (S3).

Next, the start of the simple setup using an EAPOL frame format is declared (announced) (S4).

Next, the Enrollee 100B adds a flag indicating that the Enrollee 100B has the function to generate the optical wireless PIN code (hereinafter "optical wireless PIN code activation flag") to the message M1 which is for transmitting the public key $PK_E$ on the Enrollee 100B side (S5), and transmits the message M1 including the "optical wireless PIN code activation flag" to the Registrar 100A (S6).

Further, for example, the optical wireless PIN code activation flag may be implemented by using a vendor dedicated extended region formulated by WPS.

The Registrar 100A having received the message M1 from the Enrollee 100B checks the optical wireless PIN code activation flag included in the message M1 to make sure that the Enrollee 100B supports the optical wireless PIN code activation flag (S6.1).

Next, the Registrar 100A adds the optical wireless PIN code activation flag to the message M2 for transmitting the public key $PK_R$ on the Registrar 100A side (S5), and transmits the message M2 including the optical wireless PIN code activation flag to the Enrollee 100B (S8).

The Enrollee 100B having received the message M2 from the Registrar 100A checks the optical wireless PIN code activation flag included in the message M2 to make sure that the Registrar 100A supports the optical wireless PIN code activation flag (S8.1).

After the time point when the Registrar 100A and the Enrollee 100B determine that the Enrollee 100B and the Registrar 100A, respectively support the optical wireless PIN code activation flag, both the Registrar 100A and Enrollee 100B perform the authentication using the optical wireless PIN code activation flags in place of the fixed codes stored in the respective fixed code storages 18, and share the configuration data (S9/S10).

As described, a sequence including the "ability exchange" in the EAP-WSC phase is described. However, the above described sequence is an example only. Namely, for example, the "ability exchange" may be performed using the information elements (i.e., "Information Entity" formulated in IEEE 802.11) before the EAP-WSC phase. Further, it is preferable, that the "ability exchange" be performed within a framework of the standard protocol.

As described above, according to the embodiment, as shown in FIG. 3, the authentication may be successful only when the Registrar 100A and Enrollee 100B are disposed within the irradiation range of the illumination light from the LED lighting device 200.

Also, the authentication inevitably fails when only one of the wireless communication apparatus is outside of the irradiation range of the illumination light from the LED lighting device 200 (e.g., in the other room). Therefore, even when a malicious third party is able to know the timing when the push button is pressed, a man-in-the-middle attack by the malicious third party who is in the other room which is outside the irradiation range of the illumination light from the LED lighting device 200 may not be successful.

Figure 6:
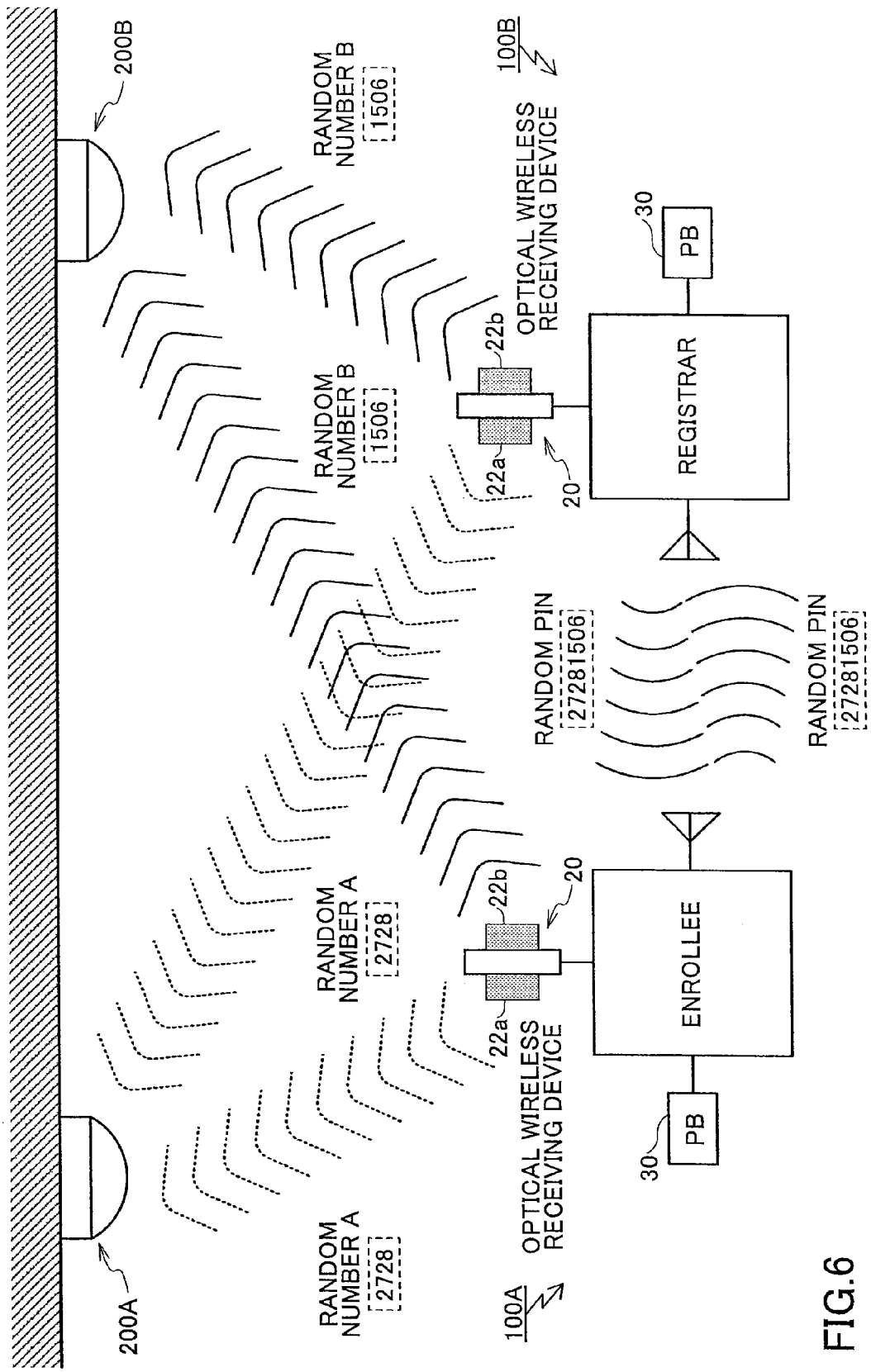
FIG. 6 is a drawing showing a wireless LAN system according to another embodiment.

Further, in another embodiment, as shown in FIG. 6, two or more different pseudo random numbers may be distributed from two or more optical wireless transmission units. In the case of FIG. 6, different pseudo random numbers ("2728" and "1506") are distributed from two LED lighting devices 200A and 200B, respectively, mounted on the ceiling.

Further, in this embodiment, the optical wireless receiving device 20 includes two light receiving sections 22a and 22b having different directivities from each other, so that the light receiving section 22a receives the pseudo random number ("2728") distributed from the LED lighting device 200A and the light receiving section 22b receives the pseudo random number ("1506") distributed from the LED lighting device 200B.

Further, the authentication code generators 14 of the Registrar 100A and Enrollee 100B generate one authentication code based on two different pseudo random numbers in accordance with a predetermined algorithm.

In this embodiment, by appropriately adjusting the directivities of the LED lighting devices 200A and 200B (i.e., optical wireless transmission and reception devices) and the directivities of the optical wireless receiving devices 20, the area where the authentication is successfully performed may be limited to small areas. Therefore, for example, it may become possible to respond to a request for limiting the wireless LAN circumstance only to an area on the desk in the meeting room.

As described above, according to an embodiment of the present invention, it may become possible to appropriately reduce the security risk while the convenience of the push button method is maintained.

As described above, as an embodiment, a case is described where the LED lighting device is used as the optical wireless transmission unit. However, it should be noted that the present invention does not limit the type or wavelength of the light source used in the optical wireless communications. Namely, for example, an LED emitting infrared light may be used as the light source.

Further, the present invention is not limited to be applied to the WPA protocol. Namely, it may not be necessary to emphasize that the present invention may also be applied to any other simple setup protocol employing a similar push button method.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The functions described in the above embodiments may be realized by a computer-readable program written in, for example, an object-oriented language such as C, C++, C#, Java (registered trademark) or the like. The program according to an embodiment of the present invention may be stored in and distributed using a hard disk drive, CD-ROM, MO, DVD, flexible disk, EEPROM, EPROM, or the like. Further, the program may be transmitted via a network using a format readable by other devices.

What is claimed is:

1. A wireless communication apparatus, comprising:
   an optical wireless receiver including first and second light receivers having different directivities, wherein the receiver is configured to optically receive a pseudo random number from a lighting device;
   an authentication code generator configured to generate a first authentication code based on the pseudo random number received by the optical wireless receiver which includes different pseudo random numbers received by the first and second light receivers;
   a push button configured to accept input from a user; and
   a controller configured to
      perform authentication by determining whether a second authentication code based on the pseudo random number and received from a given wireless communication apparatus corresponds to the first authentication code generated by the authentication code generator, and
      perform wireless communications with the given wireless communication apparatus in response to detection of the input and determining that the second authentication code received from the given wireless communication apparatus matches the first authentication code generated by the authentication code generator.

2. The wireless communication apparatus according to claim 1, wherein the controller is configured to
   determine whether the given wireless communication apparatus has a function to generate the second authentication code, and perform authentication using the first authentication code with the given wireless communication apparatus when determining that the given wireless communication apparatus has the function to generate the second authentication code.

3. The wireless communication apparatus according to claim 2, further comprising:
a storage configured to store a fixed code,
wherein the controller is configured to perform authentication using the fixed code with the given wireless communication apparatus when determining that the given wireless communication apparatus does not have the function to generate the second authentication code.

4. The wireless communication apparatus according to claim 1, wherein the push button receives input from the user by being pressed down by the user.

5. The wireless communication apparatus according to claim 1, wherein the wireless communication apparatus serves as a registrar.

6. The wireless communication apparatus according to claim 1, wherein the wireless communication apparatus serves as an enrollee.

7. A non-transitory computer-readable medium encoded with computer-readable instructions thereon that, when executed by a computer, cause the computer to perform a method comprising:
optically receiving a pseudo random number with an optical wireless receiver comprising first and second light receivers having different directivities;
generating a first authentication code based on the pseudo random number received by the optical wireless receiver which includes different pseudo random numbers received by the first and second light receivers;
accepting input from a user on a push button;
performing authentication by determining whether the first authentication code corresponds to a second authentication code based on the pseudorandom number and received from a given wireless communication apparatus, and
performing wireless communications with the given wireless communication apparatus in response to detection of the input by the push button and determining that the second authentication code received from the given wireless communication apparatus matches the first authentication code.

8. The non-transitory computer-readable medium according to claim 7, further comprising:
determining whether the given wireless communication apparatus has a function to generate the second authentication code, and
performing authentication using the first authentication code with the given wireless communication apparatus when determining that the given wireless communication apparatus has the function to generate the second authentication code.

9. The non-transitory computer-readable medium according to claim 8, further comprising:
storing a fixed code, and
performing authentication using the fixed code with the given wireless communication apparatus when determining that the given wireless communication apparatus does not have the function to generate the second authentication code.

10. A method of mutually authenticating and establishing a secure connection between a first wireless communication apparatus and a second wireless communication apparatus, the method comprising:
establishing a temporary connection between the first wireless communication apparatus and the second wireless communication apparatus based on receiving a first input on a push button of the first wireless communication apparatus by a user and a second input on a second push button of the second wireless communication apparatus by a user within a predetermined time period starting from the first input,
optically receiving, by the first wireless communication apparatus and the second wireless communication apparatus when the temporary connection is established therebetween, a pseudo random number from a lighting device;
generating, by the first wireless communication apparatus, a first authentication code based on a pseudo random number optically received thereby;
generating, by the second wireless communication apparatus, a second authentication code based on the pseudo random number optically received thereby;
determining, by the first communication apparatus, whether the second authentication code generated by the second wireless communication apparatus corresponds to the first authentication code generated by the first wireless communication apparatus, and
performing wireless communications, via the secure connection, between the first wireless communication apparatus and the second wireless communication apparatus in response to detection of the first input and the second input and determining that the second authentication code generated by the second wireless communication apparatus matches the first authentication code generated by the first wireless communication apparatus.

* * * * *